United States Patent
Hsiung et al.

(10) Patent No.: US 7,206,026 B2
(45) Date of Patent: Apr. 17, 2007

(54) METHOD AND APPARATUS FOR ADAPTIVE FRAME RATE CONVERSION

(75) Inventors: Jackie Hsiung, Taipei (TW); Sheng-Che Tsao, Taipei (TW); An-Te Chiu, Taipei (TW)

(73) Assignee: Via Technologies, Inc. (TW)

( * ) Notice: Subject to any disclaimer, the term of this patent is extended or adjusted under 35 U.S.C. 154(b) by 523 days.

(21) Appl. No.: 10/851,239

(22) Filed: May 24, 2004

(65) Prior Publication Data

US 2004/0236807 A1 Nov. 25, 2004

(51) Int. Cl.
*H04N 7/01* (2006.01)

(52) U.S. Cl. ...................... 348/441; 348/452

(58) Field of Classification Search ............. 348/448, 348/441, 451, 452, 458, 459, 443, 446, 699–701; H04N 7/01, 11/20
See application file for complete search history.

(56) References Cited

U.S. PATENT DOCUMENTS

| | | | | |
|---|---|---|---|---|
| 6,108,047 A | * | 8/2000 | Chen | 348/448 |
| 6,330,032 B1 | * | 12/2001 | Boehlke | 348/452 |
| 7,057,665 B2 | * | 6/2006 | Jung et al. | 348/452 |
| 7,129,987 B1 | * | 10/2006 | Westwater | 348/441 |

* cited by examiner

*Primary Examiner*—Sherrie Hsia

(57) ABSTRACT

A method and apparatus for adaptive frame rate conversion comparing the steps of calculating a plurality of motion vectors of a plurality of blocks to generate a motion judgment value; comparing the motion judgment value with a threshold value to decide a frame rate conversion approach; and executing the frame rate conversion approach. Furthermore, the apparatus for adaptive frame rate conversion comparing a motion vector processing unit for extracting and calculating a plurality of motion vectors from a plurality of blocks of an incoming image to generate a motion judgment value; a microprocessor for comparing the motion judgment value with a threshold value to generate a comparing result and determining a frame rate conversion approach according to the comparing result; and a video processing unit for executing the frame rate conversion approach determined by the microprocessor.

10 Claims, 5 Drawing Sheets

METHOD AND APPARATUS FOR ADAPTIVE FRAME RATE CONVERSION

BACKGROUND OF THE INVENTION

1. Field of the Invention

The present invention relates to a frame rate conversion, and more particularly, to a method and apparatus for adaptive frame rate conversion.

2. Description of the Prior Art

Generally, a video signal containing a motion picture displays a certain fixed number of still pictures one after another per second instead of a continuous signal. Each displayed fixed picture is called a frame. The number of frames displaying per second is defined as a frame rate of this video signal. At present, each country and video player adopt different video signal formats, also accompanying various frame rates. Therefore, it is indispensable to have an appropriate frame rate conversion method between different video signal formats so that they are played and watched in the right visual effect. For example, once two present video signal formats, NTSC with a frame rate of 30 frames per second and PAL with a frame rate of 25 frames per second, are expected to be compatible, the frame rate conversion has to be performed. Obviously, there is the difference of 5 frames per second between the two formats. That is, 5 frames have to be removed in per second when converting NTSC to PAL, and equivalent frames have to be inserted in the reverse operation in order to equalize the frame rate. Usually, two aspects are considered to deal with frames to carry out the frame rate conversion. One is dealing with an entire frame and the other is for parts of a frame. These two aspects are described as following respectively.

For dealing with an entire frame in frame rate conversion, there are frames that have to be removed or inserted to equalize the frame rate between different video signal formats. Consider conversions shown in FIG. 1A and FIG. 1B, schematic diagrams of the aforementioned example about NTSC format converting to PAL format, and vice versa. F00 to F11 . . . represent the frames to be played per second in the two video signals, wherein only partial frames per second are drawn in order to make the diagrams concise and to provide a clear description for an easy understanding. In FIG. 1A accordingly, one frame has to be removed in a 6 frame interval for NTSC, thus 5 frames (such as F05, F11, etc.) are removed totally per second and the frame rate of 25 frames per second is achieved that is equal to the frame rate of PAL, hence the conversion from NTSC to PAL is then accomplished. In FIG. 1B, a similar mechanism with FIG. 1A but operates reversely, one frame has to be inserted in a 5 frame interval, thus 5 frames (such as F041, F091, . . . etc.) are inserted totally per second and the frame rate of 30 frames per second is achieved that is equal to the frame rate of NTSC, hence the conversion from PAL to NTSC is then accomplished. While the conversion is completed via removing frames, we say that the frames are dropped and the conversion is called frame drop conversion. By contrast, while the frames are inserted to complete the conversion, we say that frames are duplicated and the conversion is called frame duplication conversion.

However, significant jump or delay phenomena of the video signal can be observed when the aforementioned frame drop or duplication conversion is utilized to convert the frame rate between different video signal formats. Consider continuous frames representing a moving object A in a video signal as shown in FIG. 1C, FIG. 1D and FIG. 1E. FIG. 1C shows the object 'A' moving from left to right. While the frame F02 is dropped as performing the frame drop conversion, as shown in FIG. 1D, the object A is observed appearing at left then following at right instead of moving smoothly, thus the jump phenomenon is caused. While the frame F02 is duplicated to generate frame F021 as performing the frame duplication conversion, as shown in FIG. 1E, the object A is observed staying at an identical position for a moment, thus the delay phenomenon is caused. The jump or delay phenomena are due to the aforementioned basic principle of the video signal containing a motion picture that displays a certain fixed number of still frames one after another per second. If any frames are dropped, the time vacancy is increased between the adjacent frames of the dropped frame, thus the displaying time between the adjacent frames is doubled and the jump phenomenon occurs. If any frames are duplicated, the identical frames are displayed twice hence the delay phenomenon occurs. Accordingly, the continuity of this video signal containing motion picture is also decreased.

Instead of dropping or duplicating an entire frame, it is beneficial to deal with a portion of the frame that is called a field. A frame has two fields those are top and bottom fields. Dropping one field between two adjacent frames carries out field drop conversion and the remaining fields in the two frames are combined to become a new frame. The aforementioned jump problem can be solved by applying a field drop conversion since the displaying time of a field is one half of a frame, and the time vacancy is hence reduced to one half as dropping a field instead of a frame. As performing field duplication conversion, the time addition only increases one half in each frame hence the delay problem is improved. FIG. 2A and FIG. 2B are the schematic diagrams about frame rate conversion from NTSC to PAL and vice versa with field drop or duplication conversion. F00 to F11 . . . represent the frames to be played per second in the two video signals, wherein T00 to T11 are the top fields and B00 to B11 are the bottom fields of these frames. In FIG. 2A, B02, B03, T08 and T09 are dropped, and then T02, T03, B08 and B09 are respectively combined to generate new frame F021 and F081. This is called field drop conversion, wherein selecting T03 and B08 but not B03 and T08 to form the new frame F021 and F081 is based on the consideration of well mixed selection. In FIG. 2B, T02 and B02 are duplicated to generate B021 and T021, and then combining T02 and B021 to form a new frame F021, combining T021 and B02 to form a new frame F022. This is called field duplication conversion.

Although jump or delay problems can be solved via the field drop or field duplication conversion, the drawback is its complex processes. In other hand, there is no obvious improvement as applying on vide signals containing many still images. There are no differences in dealing with frames or fields for still images according to the identical images in all frames in video signal. Frames with identical images at the same position are displayed one after another as time goes by, so no jump or delay problems will be observed even existing removing or duplicating frames.

Accordingly, the two aforementioned frame rate conversions exist corresponding advantages and drawbacks. Frame drop or duplication (also referred to frame dropped/duplicated) conversion should be applied on video signal for displaying a still image in order to enhance the speed and to simplify the processes in conversion. Field drop or duplication (also referred to field dropped/duplicated) conversion should be applied on video signal for displaying a moving image to enhance the continuity and to reduce the jump or delay phenomena as the conversion being carried out.

Hence, how to take the advantage from combining the two frame rate conversions to different scenarios is the intention of this invention.

SUMMARY OF THE INVENTION

Accordingly, the frame rate conversions in the prior art exist the jump or delay phenomena and non-adaptive processing problems. The present invention directs to a method and apparatus for adaptive frame rate conversion, and a method for selecting a suitable frame rate conversion approach. The present invention discloses a method for adaptive frame rate conversion, and the method comprising the steps of comparing and calculating a plurality of motion vectors of a plurality of blocks to generate a motion judgment value; comparing the motion judgment value with a threshold value to decide a frame rate conversion approach; and executing the frame rate conversion approach.

The present invention provides an apparatus for adaptive frame rate conversion, and the apparatus comprising a motion vector processing unit for extracting and calculating motion vectors from each block of an incoming image, wherein the image possesses the features of a compressed and encoded image; a microprocessor for comparing the motion judgment value with a threshold value to select an appropriate frame rate conversion approach; and a video processing unit for executing the conversion approach according to a comparing result outputted by the microprocessor.

Moreover, The present invention further provides a method for determining frame rate conversion comprising the steps of determining whether an incoming image is a moving image or a still image according to a plurality of motion vectors of a plurality of blocks of the incoming image and a plurality of threshold values; adopting a field dropped/duplicated approach when said incoming image is a moving image, and adopting a frame dropped/duplicated approach when said incoming image is a still image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Some embodiments of the invention are described below. However, except the present details, the invention can also be applied in other embodiments. Hence, the scope of the invention is not limited by the following embodiments, but is decided by the present claims. And, irrelevant details are not drawn in order to make the illustrations concise and to provide a clear description for easily understanding the present invention.

Figure 1A:
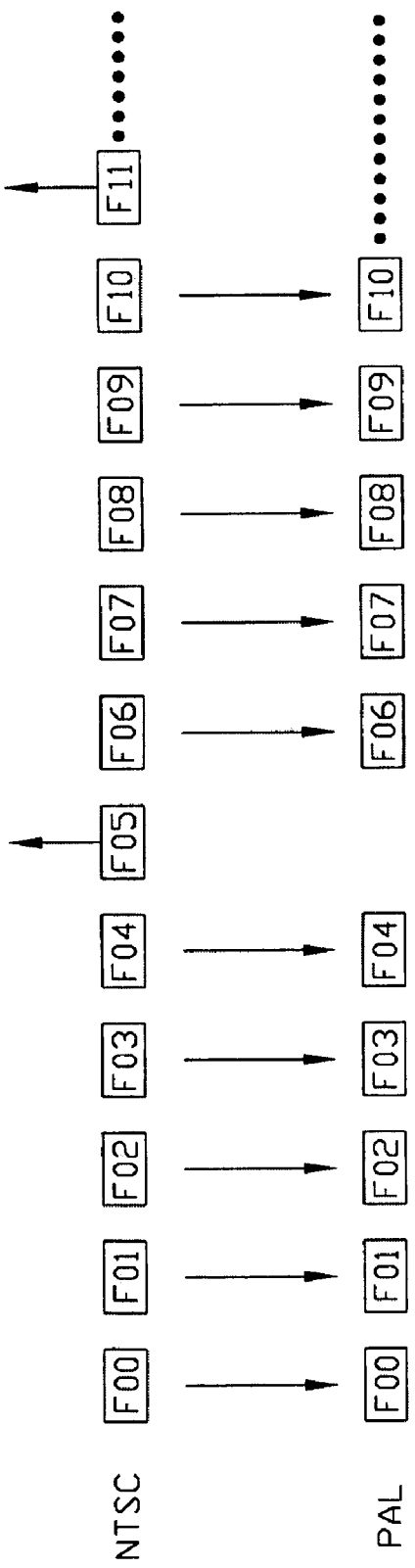
FIG. 1A is a schematic diagram of the prior art for converting the frame rate from NTSC to PAL by frame drop based frame rate conversion method.
Figure 1B:
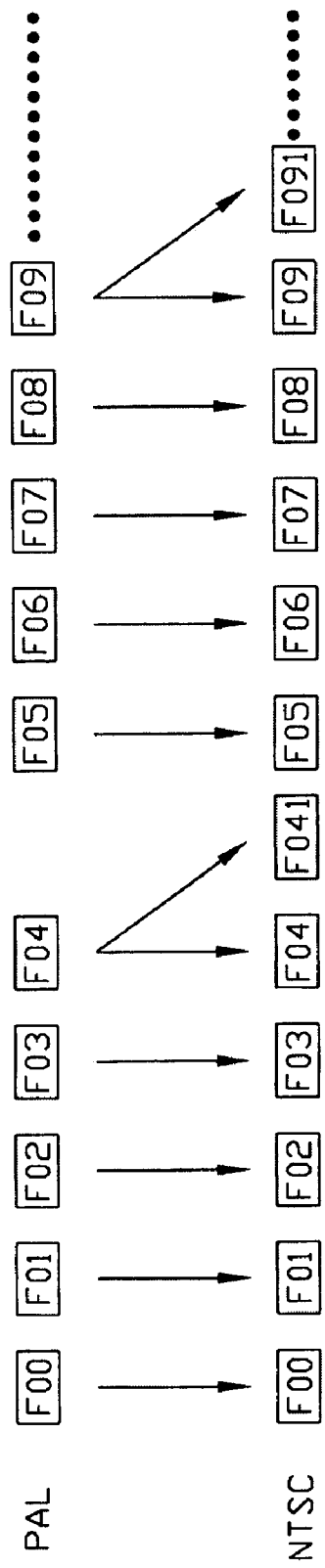
FIG. 1B is a schematic diagram of the prior art for converting the frame rate from PAL to NTSC by frame duplication based frame rate conversion method.
Figure 1C:
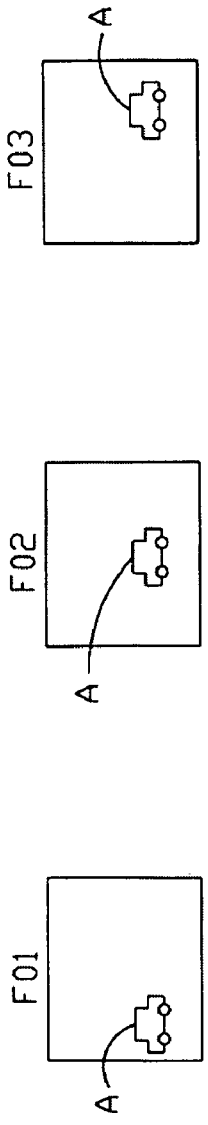
FIG. 1C, FIG. 1D and FIG. 1E illustrate the phenomena produced by frame drop/duplication based frame rate conversion method of the prior art.
Figure 1D:
Figure 1E:
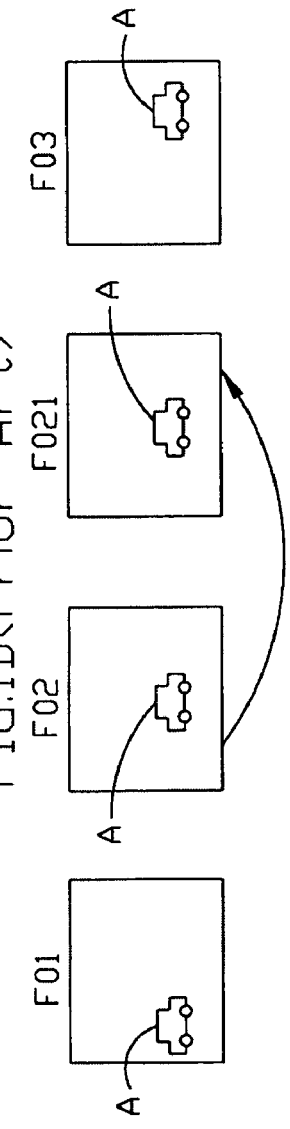
Figure 2A:
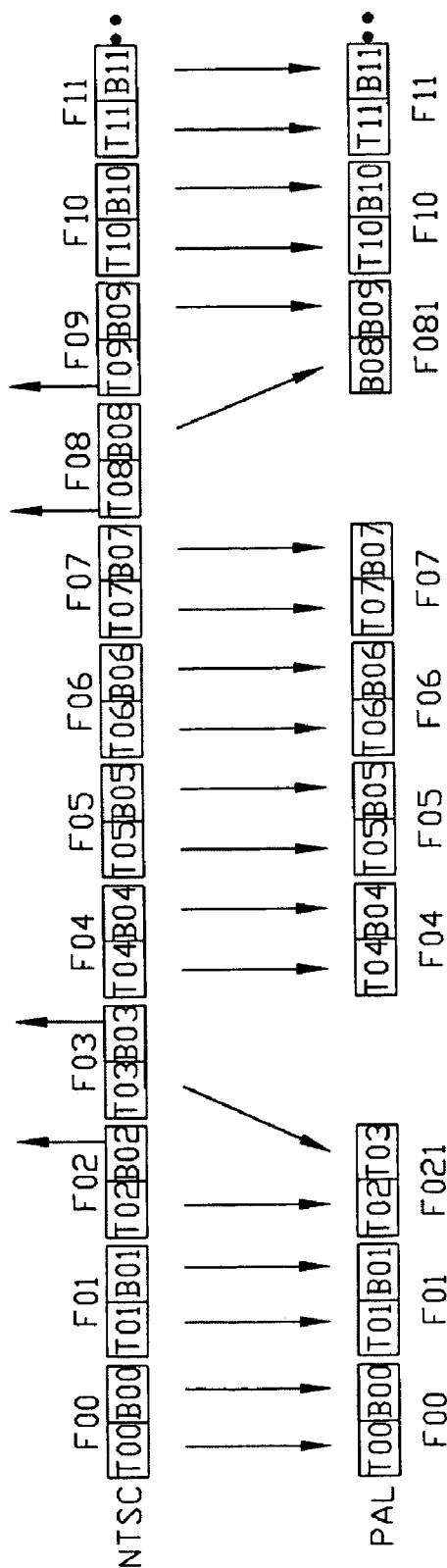
FIG. 2A is a schematic diagram of the prior art for converting the frame rate from NTSC to PAL by field drop based frame rate conversion method.
Figure 2B:
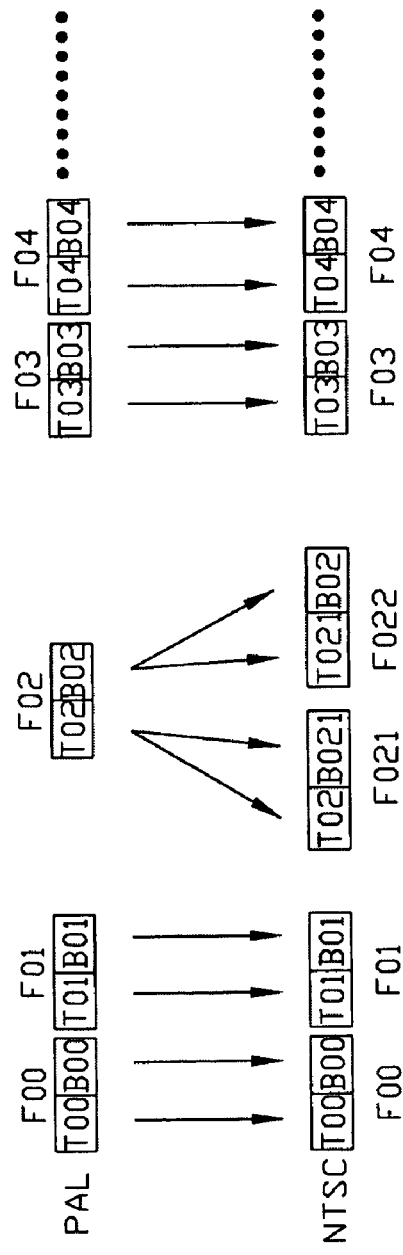
FIG. 2B is a schematic diagram of the prior art for converting the frame rate from PAL to NTSC by field duplication based frame rate conversion method.
Figure 3:
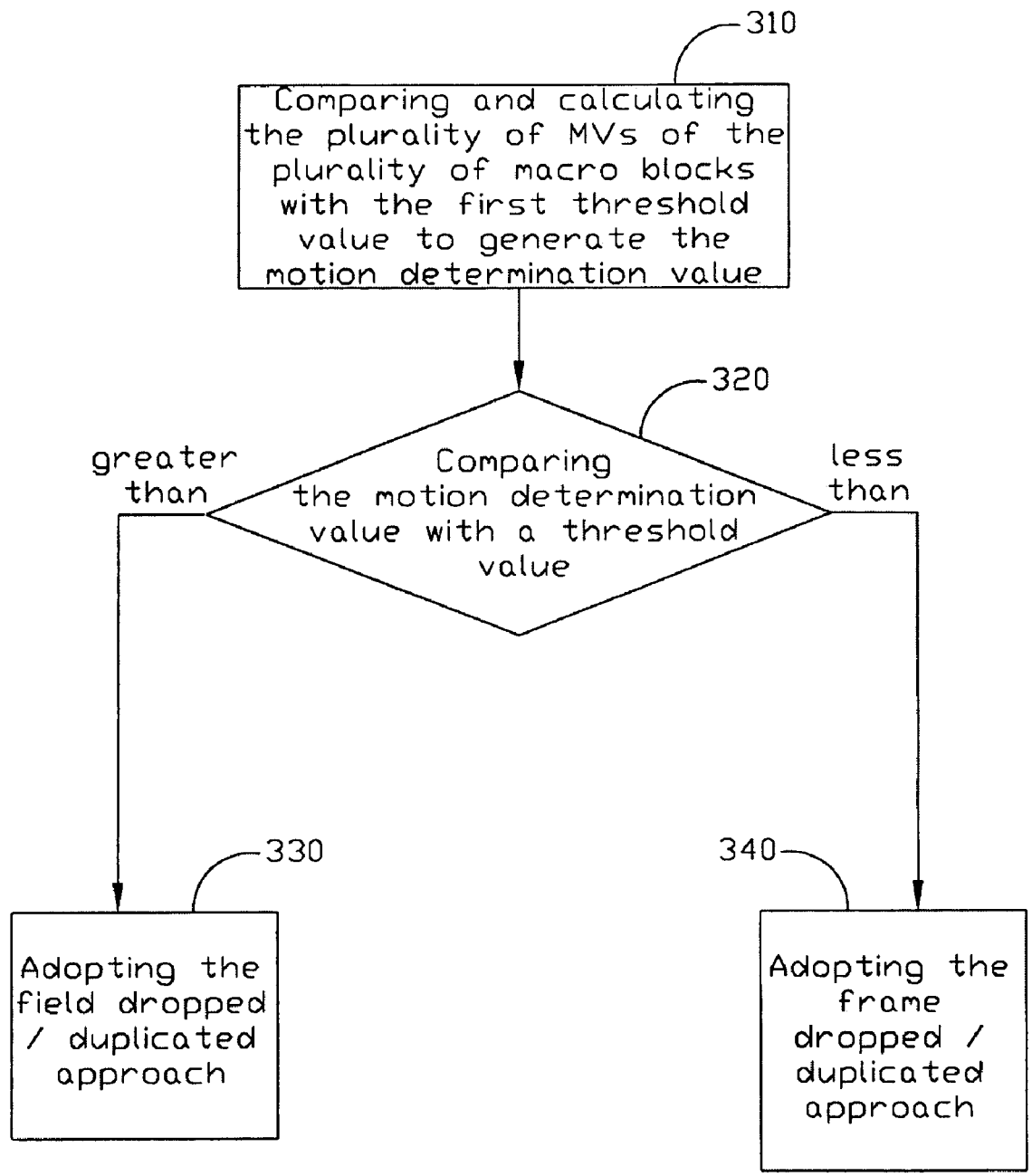
FIG. 3 is a flowchart diagram of the adaptive frame rate conversion in accordance with the present invention.

FIG. 3 is the flowchart diagram of one preferred embodiment of the present invention. In step 310, calculating the value of the motion vector of each block by summarizing the absolute values for all directional components, then respectively comparing the motion vector of each block with the first threshold value to generate a motion judgment value. For example, summarizing the absolute values for components in X-axis and Y-axis, which are called X component and Y component. The summarized value of the motion vector for each block compares with the first threshold value, wherein the first threshold value is an adjustable variable for screening the motion vectors. A number of the blocks accumulate on condition that their motion vector values are greater than the first threshold value, and the total number of these blocks is defined as the motion judgment value for the accompanying process.

In step 320, comparing the motion judgment value with the second threshold value to decide the image whether still or moving, wherein the second threshold value is an adjustable variable for deciding the incoming image being still or moving. As the motion judgment value is more than the second threshold value, the image is designated to be a moving image, and the field dropped/duplicated conversion approach is adopted, as shown in step 330. By contrast, as the image is designated to be a still image, that is, the motion judgment value is less than the second threshold value, and the frame dropped/duplicated conversion approach is adopted, as shown in step 340. As for step 330 and 340 are respectively the aforementioned field and frame conversions and have been described on above, thus the description will not be repeated here.

Figure 4:
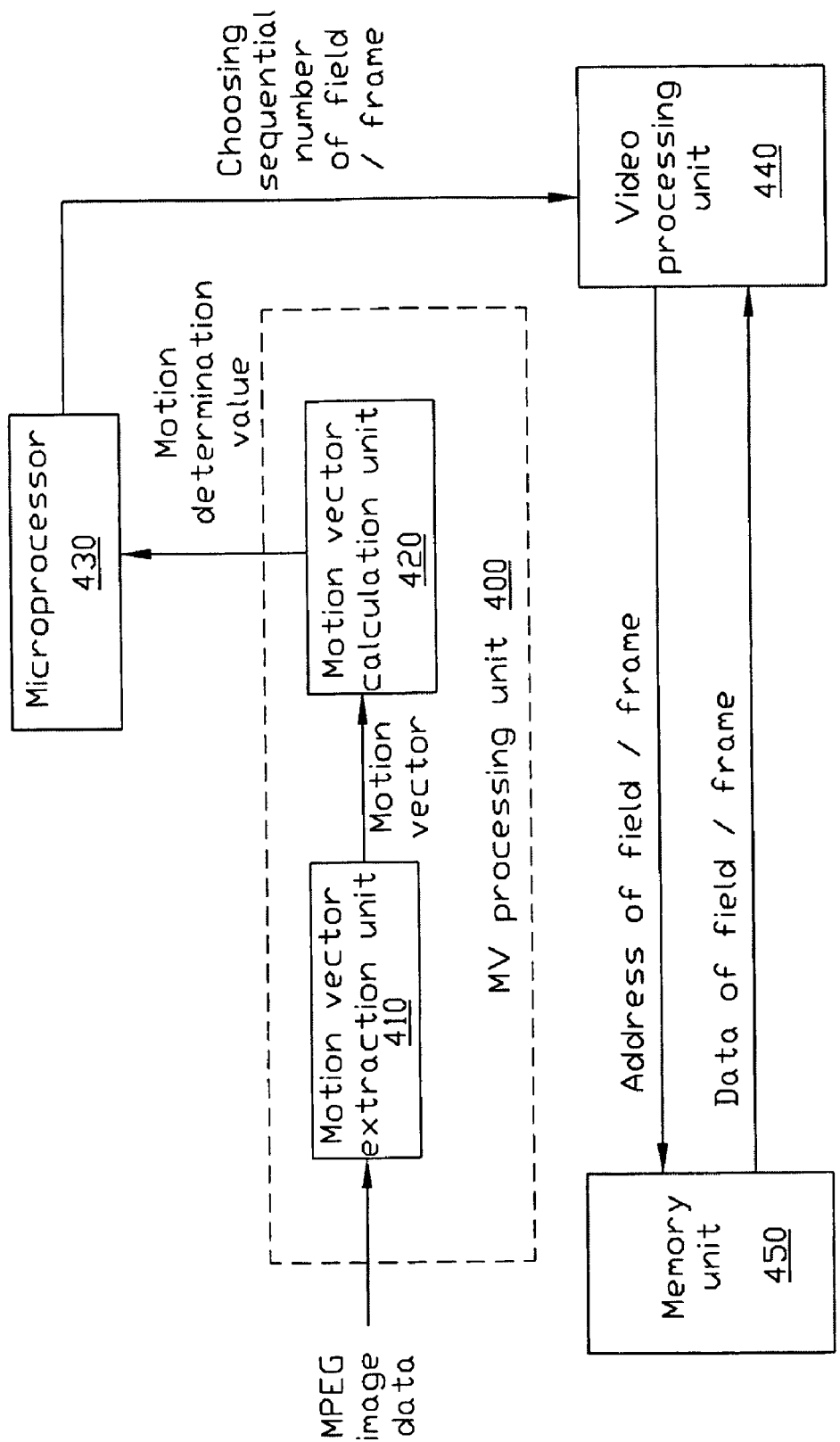
FIG. 4 is a block diagram of the embodiment in accordance with the present invention.

FIG. 4 is the block diagram of one preferred embodiment of the present invention. A motion vector processing unit 400 could be further divided into a motion vector extraction unit 410 and a motion vector calculation unit 420. The motion vector extraction unit 410 extracts motion vectors from each block of an incoming image, wherein the image possesses the features of a compressed and encoded image. The motion vector calculation unit 420 compares and calculates the motion vector of each block, wherein each motion vector is compared with a first threshold value respectively and the motion judgment value is generated via accumulating a number of blocks whose motion vector values exceed the first threshold value. A microprocessor 430 compares the motion judgment value with a second threshold value to decide the incoming image to be still or moving, and further selects a suitable frame rate conversion approach. Wherein, a frame dropped/duplicated conversion approach is adopted on a still image to simple the complex conversion; by contrast, a field dropped/duplicated conversion approach is adopted on a moving image to enhance the video continuity. A video processing unit 440 executes the frame dropped/duplicated or the field dropped/duplicated conversion approach according to the comparing result outputted by the microprocessor unit 430, wherein the frame rate conversions are described above and will not be repeated here. A memory unit 450 stores video image data for the video processing unit 440 to further retrieve and process.

According to the description mentioned above, the present invention further provides a method to diagnose and determine an appropriate frame rate conversion approach, including comparing and calculating the motion vector of each block to further generate a motion judgment value, wherein each motion vector is compared with a first threshold value respectively and the motion judgment value is generated via accumulating a number of blocks whose values of motion vectors exceed the first threshold value. The motion judgment value is compared with a second threshold value to decide the image whether still or moving. The step of comparing and calculating the motion vectors includes an operation as follows:

$$(|motion\_vector\_x| + |motion\_vector\_y|) - threshold1,$$

where $|motion\_vector\_x|$ represents an absolute value of a first component of said motion vector in X-axis direction, $|motion\_vector\_y|$ represents an absolute value of a second component of said motion vector in Y-axis direction, and said threshold1 represents said first threshold value.

The aforementioned preferred embodiments are only used to illustrate the present invention, not intended to limit the scope thereof. Many modifications of the embodiments can be made without departing from the spirit of the present invention and should be coming within the scope of the appending claims.

What is claimed is:

1. A method for adaptive frame rate conversion, comprising:
   comparing and calculating a plurality of motion vectors of a plurality of blocks to generate a motion judgment value;
   comparing said motion judgment value with a threshold value to decide a frame rate conversion approach; and
   executing said frame rate conversion approach.

2. The method according to claim 1, wherein said comparing and calculating said plurality of motion vectors is respectively comparing said plurality of motion vectors with a first threshold value and accumulating a number of said blocks whose motion vectors substantially exceed said first threshold value to generate said motion judgment value.

3. The method according to claim 1, wherein said comparing said motion judgment value with said threshold value is to decide an incoming image to be still or moving.

4. The method according to claim 1, wherein
   Utilizing a field dropped/duplicated approach when said motion judgment value is substantially greater than said threshold value; and
   Utilizing a frame dropped/duplicated approach when said motion judgment value is less than said threshold value.

5. Apparatus for adaptive frame rate conversion, comprising
   a motion vector processing unit for extracting and calculating a plurality of motion vectors from a plurality of blocks of an incoming image to generate a motion judgment value;
   a microprocessor for comparing said motion judgment value with a threshold value to generate a comparing result and determining a frame rate conversion approach according to said comparing result; and
   a video processing unit for executing said frame rate conversion approach determined by said microprocessor.

6. The apparatus according to claim 5, wherein said motion vector processing unit compares and computes said plurality of motion vectors with a first threshold value and accumulating a number of said blocks whose motion vectors substantially exceed said first threshold value to generate said motion judgment value.

7. The apparatus according to claim 5, wherein said microprocessor adopts a frame dropped/duplicated approach when said incoming image is still, and said microprocessor adopts a field dropped/duplicated approach when said incoming image is moving.

8. The apparatus according to claim 5, comprising:
   a memory unit for storing video image data and offering related field or frame data according to field or frame address required by said video processing unit.

9. A method for determining frame rate conversion, comprising:
   determining whether an incoming image is a moving image or a still image according to a plurality of motion vectors of a plurality of blocks of said incoming image and a plurality of threshold values;
   adopting a field dropped/duplicated approach when said incoming image is a moving image, and adopting a frame dropped/duplicated approach when said incoming image is a still image.

10. The method according to claim 9, wherein said determining said incoming image as a moving image or a still image comprises:
    providing an adjustable first threshold value and an adjustable second threshold value;
    extracting said plurality of motion vectors from said plurality of blocks of said incoming image;
    respectively comparing said plurality of motion vectors with said first threshold value and accumulating a number of said blocks whose motion vectors substantially exceed said first threshold value to generate a motion judgment value; and
    comparing said motion judgment value with said second threshold value, wherein said incoming image is a moving image when said motion judgment value is more than said second threshold value; and said incoming image is a still image when said motion judgment value is less than said second threshold value.

* * * * *